US010612394B2

(12) United States Patent
Thistle et al.

(10) Patent No.: US 10,612,394 B2
(45) Date of Patent: Apr. 7, 2020

(54) AIRFOIL HAVING SERPENTINE CORE RESUPPLY FLOW CONTROL

(71) Applicant: United Technologies Corporation, Farmington, CT (US)

(72) Inventors: Charles Thistle, Middletown, CT (US); Evan P. Molony, Farmington, CT (US); Carey Clum, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 278 days.

(21) Appl. No.: 15/656,020

(22) Filed: Jul. 21, 2017

(65) Prior Publication Data

US 2019/0024514 A1 Jan. 24, 2019

(51) Int. Cl.
*F01D 5/18* (2006.01)
*F01D 9/04* (2006.01)
*F01D 25/12* (2006.01)

(52) U.S. Cl.
CPC ............. *F01D 5/187* (2013.01); *F01D 5/186* (2013.01); *F01D 9/041* (2013.01); *F01D 25/12* (2013.01);
(Continued)

(58) Field of Classification Search
CPC .......... F01D 5/187; F01D 5/186; F01D 9/041; F01D 25/12; F05D 2230/211; F05D 2240/304; F05D 2260/20; F05D 2220/32
See application file for complete search history.

(56) References Cited

U.S. PATENT DOCUMENTS

| 4,278,400 | A | * | 7/1981 | Yamarik | ................. F01D 5/187 |
| | | | | | 415/115 |
| 4,474,532 | A | * | 10/1984 | Pazder | .................... F01D 5/187 |
| | | | | | 415/115 |

(Continued)

FOREIGN PATENT DOCUMENTS

| DE | 19859785 A1 | 7/1999 |
| EP | 0340149 A1 | 11/1989 |

(Continued)

OTHER PUBLICATIONS

European Search Report, European Application No. 18184675.9, dated Nov. 21, 2018, European Patent Office; EP Search Report 9 pages.

*Primary Examiner* — Hung Q Nguyen
*Assistant Examiner* — Brian P Monahon
(74) *Attorney, Agent, or Firm* — Cantor Colburn LLP (57) ABSTRACT

Airfoils and airfoil cores for airfoils of gas turbine engines are provided. The airfoils include an airfoil body having a leading edge and a trailing edge, at least two serpentine flow cavities formed within the airfoil body, a resupply cavity fluidly connected to one serpentine flow cavity of the at least two serpentine flow cavities and arranged to supply a resupply air to the one serpentine flow cavity through a resupply bypass hole, a junction defined at a location where the resupply cavity fluidly connect to the one serpentine flow cavity, a separator rib within the airfoil body and fluidly separating part of the at least two serpentine flow cavities, at least one crossover rib located between the resupply bypass hole and the separator rib, and at least one crossover aperture located between the at least one crossover rib and the separator rib.

12 Claims, 8 Drawing Sheets

(52) U.S. Cl.
CPC .... *F05D 2220/32* (2013.01); *F05D 2230/211* (2013.01); *F05D 2240/304* (2013.01); *F05D 2260/20* (2013.01)

(56) References Cited

U.S. PATENT DOCUMENTS

| | | | | |
|---|---|---|---|---|
| 4,820,123 A * | 4/1989 | Hall | ............... | F01D 5/081 416/92 |
| 5,387,086 A * | 2/1995 | Frey | ............... | F01D 5/187 416/96 R |
| 5,403,157 A * | 4/1995 | Moore | ............... | F01D 5/188 415/115 |
| 5,462,405 A * | 10/1995 | Hoff | ............... | F01D 5/187 415/115 |
| 5,813,836 A * | 9/1998 | Starkweather | ............... | F01D 5/187 415/173.4 |
| 5,873,695 A * | 2/1999 | Takeishi | ............... | F01D 5/187 415/115 |
| 5,967,752 A * | 10/1999 | Lee | ............... | F01D 5/187 416/97 R |
| 5,975,850 A * | 11/1999 | Abuaf | ............... | F01D 5/187 415/115 |
| 6,036,440 A * | 3/2000 | Tomita | ............... | F01D 5/187 415/114 |
| 6,139,269 A * | 10/2000 | Liang | ............... | F01D 5/20 416/97 R |
| 6,257,830 B1 * | 7/2001 | Matsuura | ............... | F01D 5/147 415/115 |
| 6,416,284 B1 | 7/2002 | Demers et al. | | |
| 8,568,097 B1 * | 10/2013 | Liang | ............... | F01D 5/187 416/97 R |
| 9,388,699 B2 | 7/2016 | Dong et al. | | |
| 2005/0152785 A1 * | 7/2005 | McGrath | ............... | F01D 5/187 416/97 R |
| 2007/0041835 A1 * | 2/2007 | Charbonneau | ............... | F01D 5/187 416/97 R |
| 2008/0050244 A1 * | 2/2008 | Cherolis | ............... | F01D 5/187 416/97 R |
| 2009/0041587 A1 * | 2/2009 | Konter | ............... | F01D 5/187 416/97 R |
| 2011/0038735 A1 * | 2/2011 | Liang | ............... | F01D 5/187 416/97 R |
| 2012/0163993 A1 * | 6/2012 | Levine | ............... | B22C 9/10 416/97 R |
| 2013/0209268 A1 * | 8/2013 | Bregman | ............... | F01D 5/187 416/96 R |
| 2013/0216395 A1 * | 8/2013 | Bregman et al. | ............... | F01D 5/187 416/97 R |
| 2014/0086756 A1 * | 3/2014 | Papple | ............... | F01D 5/081 416/90 R |
| 2014/0271225 A1 * | 9/2014 | Herzlinger | ............... | F01D 5/187 416/96 R |
| 2015/0040582 A1 * | 2/2015 | Dong | ............... | F01D 5/187 60/806 |

FOREIGN PATENT DOCUMENTS

| | | |
|---|---|---|
| EP | 0916810 A2 | 5/1999 |
| EP | 1621731 A1 | 2/2006 |
| EP | 3184742 A1 | 6/2017 |

* cited by examiner

AIRFOIL HAVING SERPENTINE CORE RESUPPLY FLOW CONTROL

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate trailing edge core geometries that include and/or require a resupply feed to provide additional cooling air to the trailing edge region. This is done by thickening a rib aft of a connection between a serpentine passage and a resupply source in order to angle the resupply air away from the exit of the serpentine. Such ribs can increase part weight and may create additional challenges associated with manufacturing producibility. Accordingly, improved means for providing cooling at a trailing edge region of an airfoil may be desirable.

BRIEF DESCRIPTION

According to some embodiments, airfoils for gas turbine engines are provided. The airfoils include an airfoil body having a leading edge and a trailing edge, at least two serpentine flow cavities formed within the airfoil body, a resupply cavity fluidly connected to one serpentine flow cavity of the at least two serpentine flow cavities and arranged to supply a resupply air to the one serpentine flow cavity through a resupply bypass hole, a junction defined at a location where the resupply cavity fluidly connect to the one serpentine flow cavity, a separator rib within the airfoil body and fluidly separating part of the at least two serpentine flow cavities, at least one crossover rib located between the resupply bypass hole and the separator rib, and at least one crossover aperture located between the at least one crossover rib and the separator rib.

In addition to one or more of the features described herein, or as an alternative, further embodiments of the airfoils may include that the at least two serpentine flow cavities include a first serpentine cavity formed within the airfoil body and defining a portion of a serpentine cooling flow path and enabling a cooling flow in a first direction within the airfoil body, a second serpentine cavity fluidly connected to the first serpentine cavity and defining another portion of the serpentine cooling flow path and enabling a cooling flow in a second direction, and a third serpentine cavity fluidly connected to the second serpentine cavity and defining another portion of the serpentine cooling flow path and enabling a cooling flow in at least one of the first direction or a third direction, wherein a serpentine cooling air flows through the serpentine cooling flow path, wherein the resupply cavity is fluidly connected to the third serpentine cavity and the junction is located where both the second serpentine cavity and the resupply cavity fluidly connect to the third serpentine cavity.

In addition to one or more of the features described herein, or as an alternative, further embodiments of the airfoils may include that the separator rib separates a part of the first serpentine cavity from a part of the second serpentine cavity.

In addition to one or more of the features described herein, or as an alternative, further embodiments of the airfoils may include a plurality of crossover ribs located between the resupply bypass hole and the separator rib and a plurality of crossover apertures defined in part by the crossover ribs.

In addition to one or more of the features described herein, or as an alternative, further embodiments of the airfoils may include that the at least one crossover aperture includes a fillet.

In addition to one or more of the features described herein, or as an alternative, further embodiments of the airfoils may include a platform wherein the airfoil body extends from the platform, wherein the junction is located where the platform and airfoil body join.

In addition to one or more of the features described herein, or as an alternative, further embodiments of the airfoils may include an attachment, the attachment extending from the platform from a side of the platform opposite from the airfoil body.

In addition to one or more of the features described herein, or as an alternative, further embodiments of the airfoils may include a serpentine inlet arranged to supply serpentine cooling air into the one of the at least two serpentine flow cavities.

In addition to one or more of the features described herein, or as an alternative, further embodiments of the airfoils may include that a portion of the resupply air is fed into the serpentine cooling air at a location upstream from the resupply bypass hole.

In addition to one or more of the features described herein, or as an alternative, further embodiments of the airfoils may include at least one crossover aperture is circular, elliptical, or "racetrack" shaped.

According to some embodiments, cores for manufacturing airfoils of gas turbine engines are provided. The cores include at least two serpentine cavity cores arranged to define serpentine cooling flow cavities within a formed airfoil body, a resupply cavity core connected to one of the serpentine cavity cores by a bypass core and arranged to form a resupply cavity in the formed airfoil body and a resupply bypass hole, wherein a core junction is defined at a location of the resupply cavity core, the bypass core, and the one of the serpentine cavity cores, and at least one crossover cores located in the core junction, a separator rib void located between the at least two serpentine cavity cores, and at least one crossover void located between the at least one crossover core, separator rib void, and the bypass core, the at least one crossover void forming a crossover rib within the formed airfoil body.

In addition to one or more of the features described herein, or as an alternative, further embodiments of the cores may include that the at least two serpentine cavity cores include a first serpentine cavity core arranged to define a first serpentine cavity with a cooling flow in a first direction within a formed airfoil body, a second serpentine cavity core connected to the first serpentine cavity core and arranged to define a second serpentine cavity with a cooling flow in a second direction within the formed airfoil body, and a third serpentine cavity core connected to the second serpentine cavity core and arranged to define a third serpentine cavity with a cooling flow in at least one of the first direction or a third direction within the formed airfoil body, wherein the core junction is located where the second and third serpentine cavity cores are connected.

In addition to one or more of the features described herein, or as an alternative, further embodiments of the cores may include that the separator rib void is located between part of the first serpentine cavity core and part of the second serpentine cavity core.

In addition to one or more of the features described herein, or as an alternative, further embodiments of the cores may include a plurality of crossover cores, and a plurality of crossover voids located between the plurality of crossover cores, the separator rib void, and the bypass core.

In addition to one or more of the features described herein, or as an alternative, further embodiments of the cores may include that the at least one crossover core includes a fillet.

In addition to one or more of the features described herein, or as an alternative, further embodiments of the cores may include that at least one crossover core is circular, elliptical, or "racetrack" shaped.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
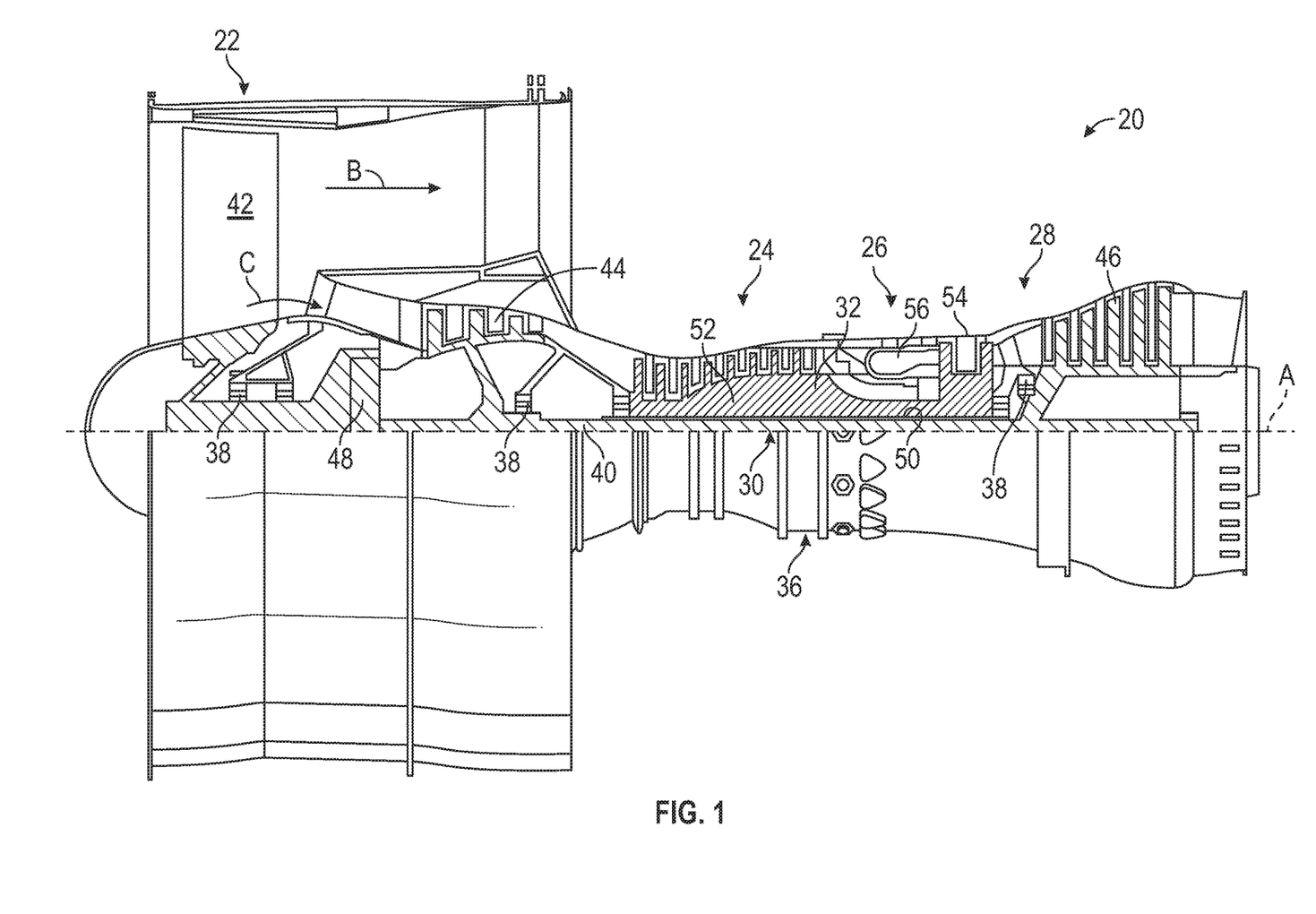
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
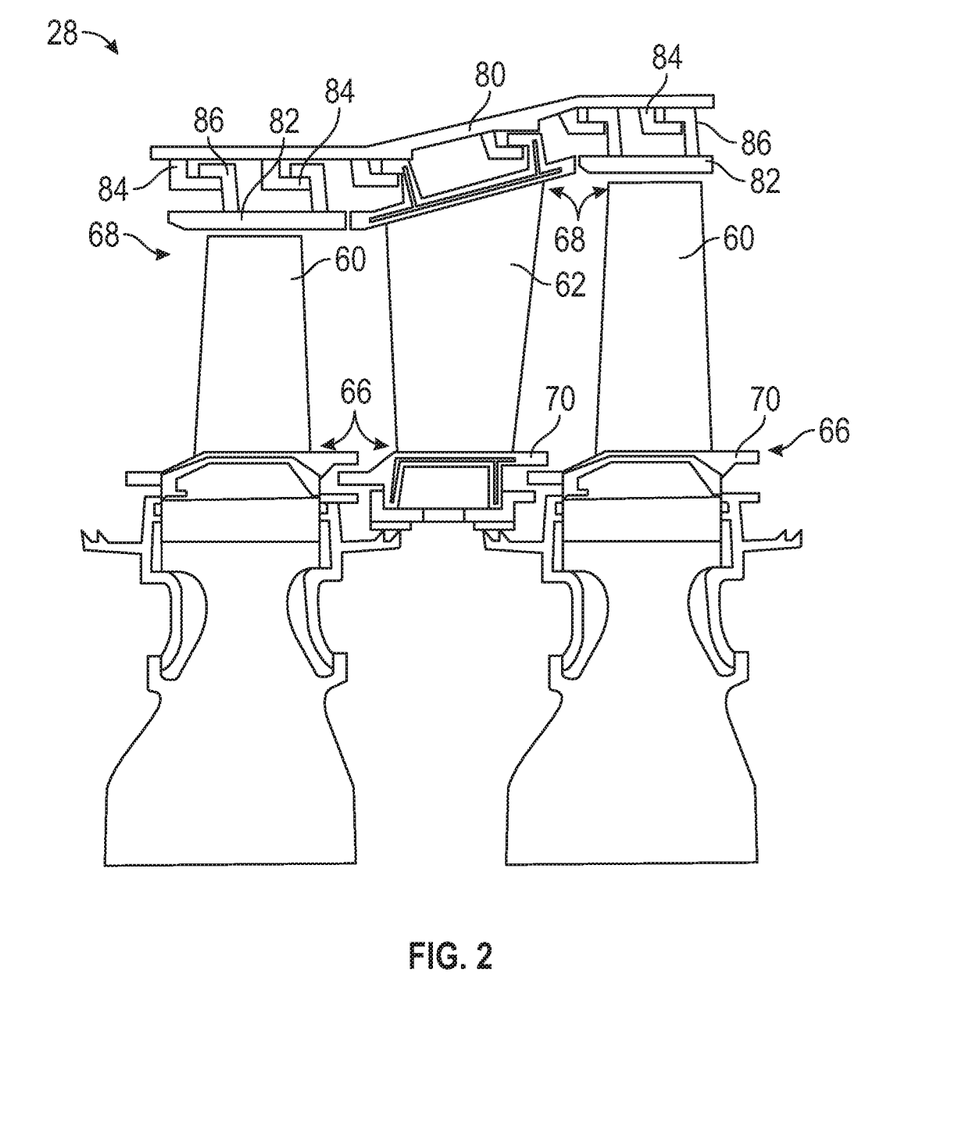
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
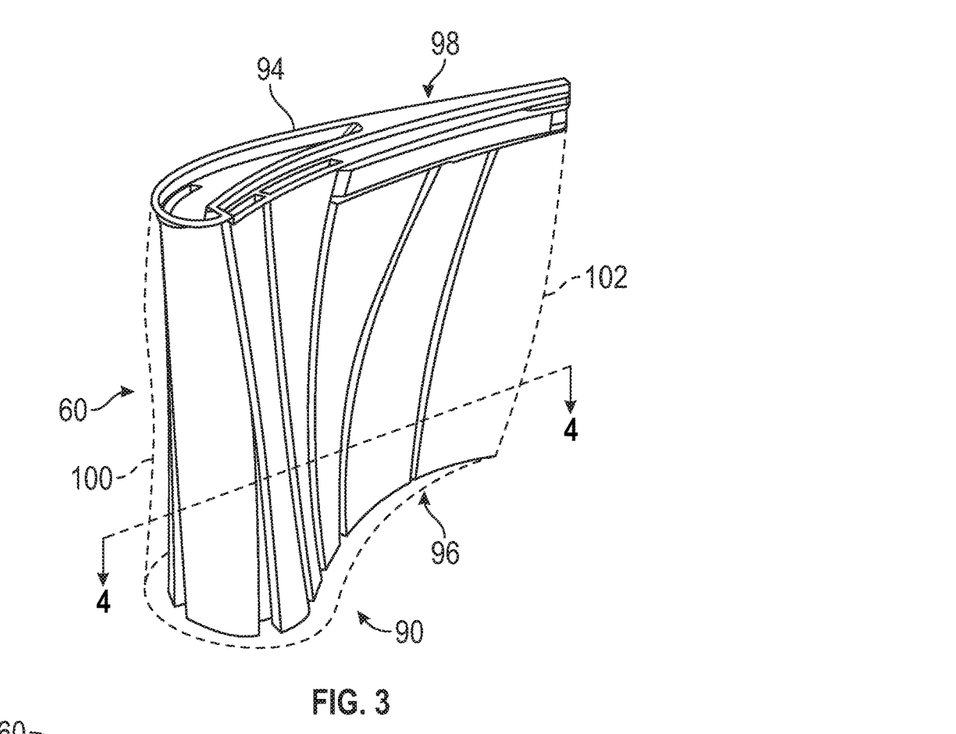
FIG. 3 is a perspective view of an airfoil that can incorporate embodiments of the present disclosure.
Figure 4:
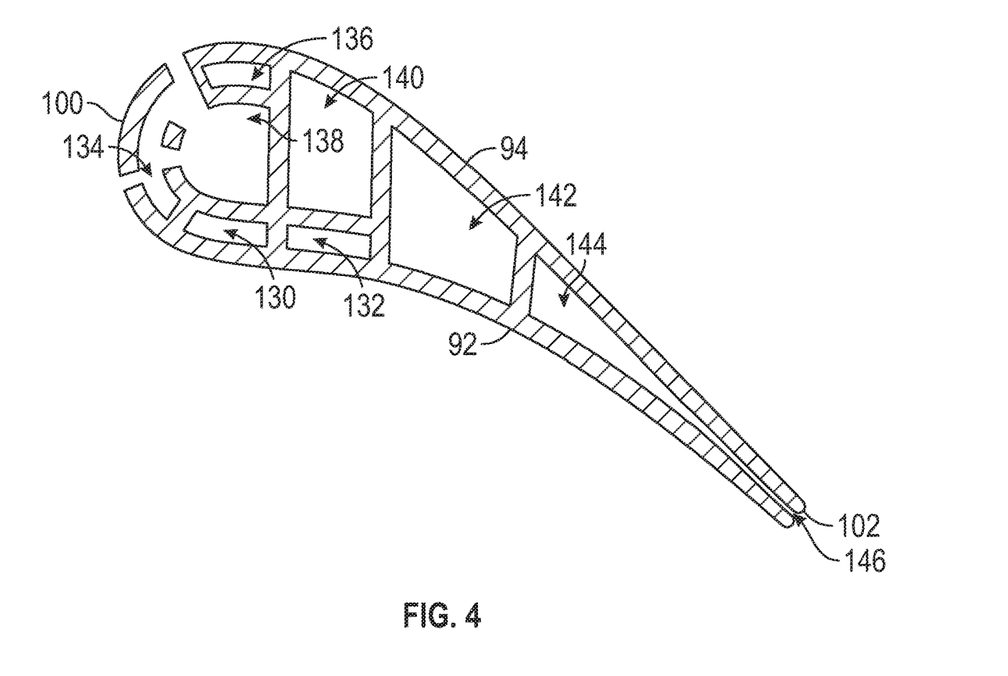
FIG. 4 is a partial cross-sectional view of the airfoil of FIG. 3 as viewed along the line 4-4 shown in FIG. 3.

As shown in FIGS. 3-4, the airfoil 60 includes an airfoil body 90 having a pressure side 92, a suction side 94, a root region 96, a tip region 98, a leading edge 100, and a trailing edge 102. The pressure side 92 is disposed opposite the suction side 94. The pressure side 92 and the suction side 94 each extend radially from the root region 96 to the tip region 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to the engine axis) between the leading edge 100 and the trailing edge 102. Each of the root region 96 and the tip region 98 extend from the leading edge 100 to the trailing edge 102 opposite each other at ends of the airfoil body 90 in the radial direction. That is, the root region 96 defines an inner radial end of the airfoil body 90 and the tip region defines an outer radial end of the airfoil body 90 (relative to an engine axis). The airfoil 60 may be a blade or vane, and have various other features associated with such configurations, e.g., platforms, tip surfaces, etc.

As shown in FIG. 4, illustrating a cross-sectional view of the airfoil 60 as viewed along the line 4-4 shown in FIG. 3, the airfoil body 90 defines or includes a plurality of internal cavities to enable cooling of the airfoil 60. For example, as shown, the airfoil 60 includes a plurality of forward and side cooling cavities 130, 132, 134, 136, 138. In the relative middle of the airfoil body 90, the airfoil 60 includes various serpentine flow cavities 140, 142, 144 and, at the trailing edge 102, a trailing edge slot 146. The most aftward serpentine flow cavity 144 defines a serpentine trailing edge core that fluidly connects to the trailing edge slot 146 that is formed at the trailing edge 102. In the present illustration, a first serpentine cavity 140 may arranged for flow in a first direction (e.g., an up pass cooling flow), a second serpentine cavity 142 may be arranged for flow in a second direction (e.g., a down pass cooling flow), and a third serpentine cavity 144 may be arranged for flow in the first direction and/or a third direction (e.g., an up pass cooling flow that exits the airfoil 60 through the trailing edge slot 146). Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Airfoils, such as airfoil 60, may incorporate trailing edge core geometries that include and/or require a resupply feed to provide additional cooling air to the trailing edge region (e.g., third serpentine cavity 144). This is typically done by thickening a rib aft, in this example, of a connection between a serpentine passaged (e.g., the divider between the second and third serpentine flow cavities 142, 144 shown in FIG. 4). Further, the thickened rib may be arranged forward relative to a resupply source in order to angle the resupply air away from the flow of the serpentine that exits from the second serpentine cavity 142 into the third serpentine cavity 144. Such ribs can increase part weight and may create additional challenges associated with manufacturing producibility. Accordingly, improved means for providing cooling at a trailing edge region of an airfoil are provided in accordance with embodiments of the present disclosure.

Embodiments of the present disclosure are directed to airfoils (blades, vanes, etc.) that includes serpentine cavity configuration having a trailing edge resupply having a structure including a "flow control feature." As used herein, the term "flow control feature" refers to a structural feature of the airfoil that restricts flow in such a way that air entering through the resupply will not have sufficient pressure to travel backwards up the (second, down pass) serpentine cavity and interfere with or otherwise negatively impact a cooling scheme of the airfoil.

Figure 5:
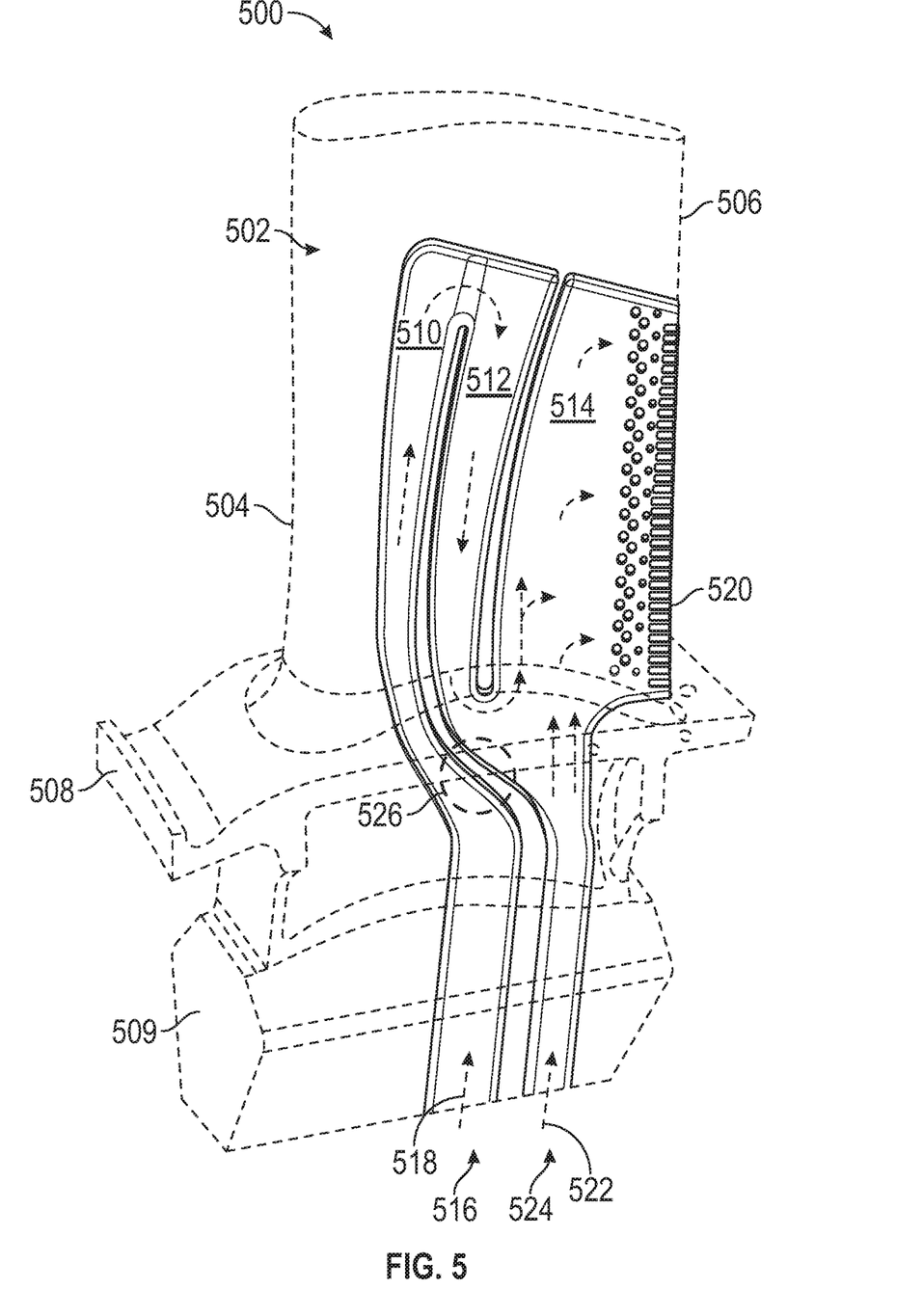
FIG. 5 is a schematic illustration of an airfoil in accordance with an embodiment of the present disclosure.

Turning now to FIG. 5, a schematic illustration of an airfoil 500 having an airfoil body 502 with a leading edge 504 and a trailing edge 506 is shown. In the present illustrative example, the airfoil 500 is shown as a blade with the airfoil body 502 extending from a platform 508. The platform 508 is arranged to connect to or otherwise attach to a rotor disc for operation within a gas turbine engine by means of attachment 509 (which may be integral or separate from the airfoil body 502). In some non-limiting arrangements, the platform 508 and attachment 509 may be integrally formed with the rotor disc, or in some embodiments the attachment 509 may be integral with a rotor disc and the platform 508 may be attached to the attachment 509. The airfoil body 502 and the platform 508 include internal cooling passages and cavities that are arranged to enable cooling air to flow through the internal portions of the airfoil 500 to provide cooling during operation. Illustratively shown in FIG. 5 is a serpentine cavity including cavities 510, 512, 514, which each define a portion of a serpentine cooling flow path. A first serpentine cavity 510 is an up pass cavity, as illustratively shown, with a serpentine inlet 516 suppling serpentine cooling air 518 through the platform 508 and into the airfoil body 502. The serpentine cooling air 518 flows upward (e.g., radially outward when installed within a gas turbine engine) through the first serpentine cavity 510. The serpentine cooling air 518 then turns and flows downward (radially inward) through a second serpentine cavity 512. The serpentine cooling air 518 then will turn again and flow upward (radially outward) into and through a third serpentine cavity 514. The serpentine cooling air 518 will then exit the airfoil 500 through one or more trailing edge slots 520 at the trailing edge 506.

As the serpentine cooling air 518 flows through the serpentine cavities 510, 512, 514 the air will absorb heat from the material of the airfoil body 502. Accordingly, the cooling efficiency of the serpentine cooling air 518 will decrease as the air moves through the serpentine cavities 510, 512, 514. To improve cooling efficiency toward the trailing edge 506 of the airfoil 500, e.g., within the third serpentine cavity 514, resupply air 522 can be introduced into the airfoil 500 through a resupply inlet 524 that is formed within the attachment 509. The resupply air 522 will interact with the serpentine cooling air 518 at a junction 526 within the airfoil 500, as shown in FIG. 5.

Figure 6:
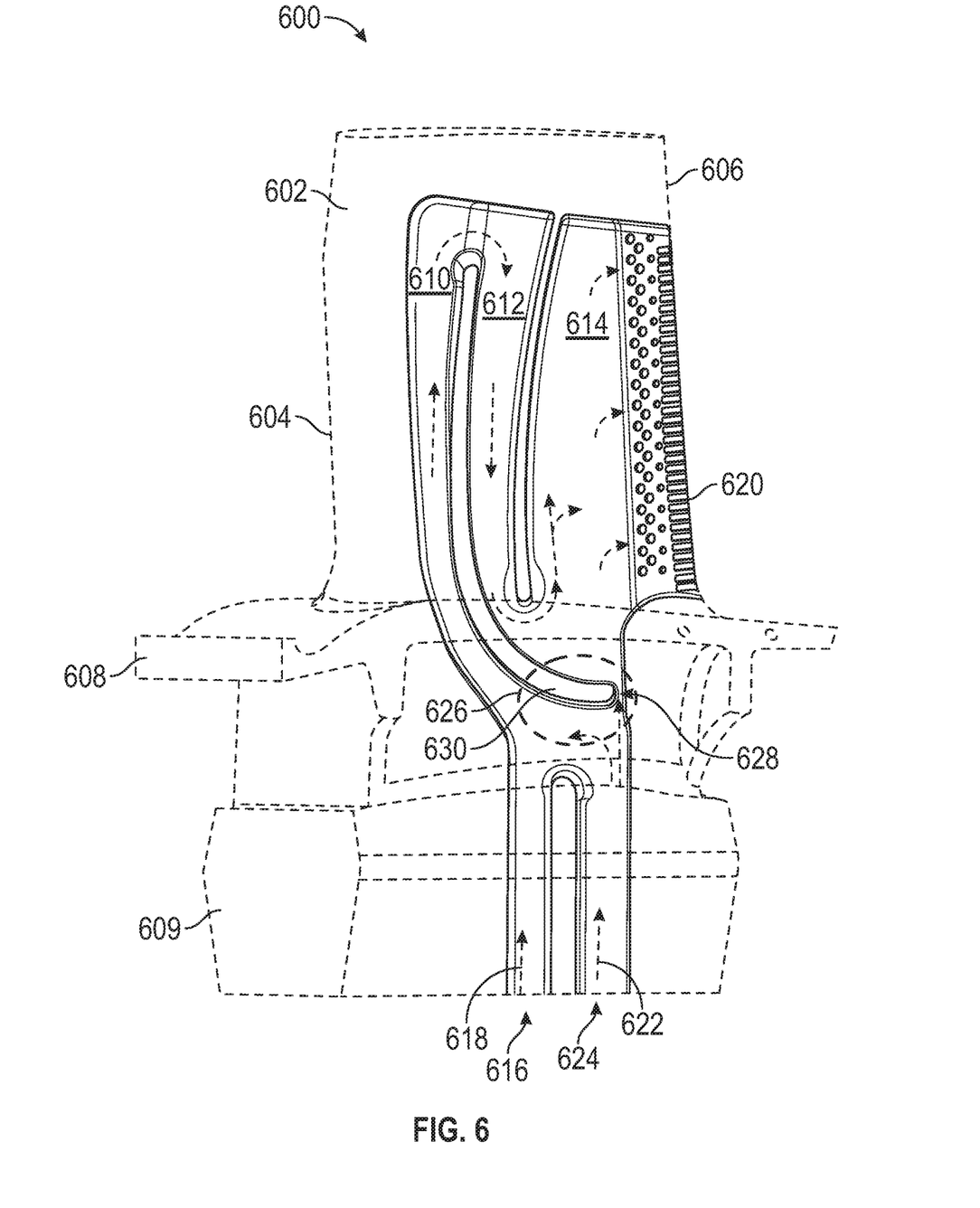
FIG. 6 is a schematic illustration of airflow through cavities of an airfoil in accordance with an embodiment of the present disclosure.

Turning now to FIG. 6, a schematic illustration of an airfoil 600 extending from a leading edge 604 to a trailing edge 606 with a different arrangement of internal cavities is shown. In the present illustrative example, the airfoil 600 is shown as a blade with the airfoil body 602 extending from a platform 608. The platform 608 is arranged to connect to or otherwise attach to a rotor disc for operation within a gas turbine engine by means of attachment 609 (which may be integral or separate from the airfoil body 602). Similar to that described above, the airfoil body 602 and the platform 608 (and attachment 609) include internal cooling passages and cavities that are arranged to enable cooling air to flow through the internal portions of the airfoil 600 to provide cooling during operation. Illustratively shown in FIG. 6 is a serpentine cooling flow path including serpentine cavities 610, 612, 614, which each define a portion of the serpentine cooling flow path. A first serpentine cavity 610 is an up pass cavity, with a serpentine inlet 616 supplying serpentine cooling air 618 through the attachment 609, platform 608, and into the airfoil body 602. The serpentine cooling air 618 flows upward (e.g., radially outward when installed within a gas turbine engine) through the first serpentine cavity 610. The serpentine cooling air 618 then turns and flows downward (radially inward) through a second serpentine cavity 612. The serpentine cooling air 618 then will turn again and flow upward (radially outward) into and through a third serpentine cavity 614. The serpentine cooling air 618 will then exit the airfoil 600 through one or more trailing edge slots 620 at the trailing edge 606.

As the serpentine cooling air 618 flows through the serpentine cavities 610, 612, 614 the air will absorb heat from the material of the airfoil body 602. Accordingly, the cooling efficiency of the serpentine cooling air 618 will decrease as the air moves through the serpentine cavities 610, 612, 614. To improve cooling efficiency toward the trailing edge 606 of the airfoil 600, e.g., within the third serpentine cavity 614, resupply air 622 can be introduced into the airfoil 600 through a resupply inlet 624 that is formed within the attachment 609. The resupply air 622 will interact with the serpentine cooling air 618 at a junction 626 within the airfoil 600, as shown in FIG. 6. In this embodiment, the flow path of the resupply air 622 is fluidly connected to the flow path of the serpentine cooling air 618 prior to entry into the third serpentine cavity 614, and a resupply bypass hole 628 enables a portion of the resupply air 622 enter the third serpentine cavity 614. The resupply bypass hole 628 provides additional cooling air to the third serpentine cavity 614 (e.g., a trailing edge cavity region). As shown, a separator rib 630, located at the junction 626, separates the cooling air supplies 616, 624 from the third serpentine cavity 614 to thus direct a larger portion through the serpentine cooling path (serpentine cavities 610, 612, 614), with a small portion passing through the resupply bypass hole 628.

Embodiments of the present disclosure provide airfoil arrangements and cores for forming the same with configurations in which the separator rib separating one or both of a dedicated trailing inlet feed (e.g., resupply inlet 624) or a serpentine feed (e.g., serpentine inlet 616) and a trailing edge cavity (e.g., third serpentine cavity 614) of an airfoil incorporates crossover apertures. In some embodiments, the separator rib may be curved and transition/terminate into a trailing edge wall material. Various embodiments include two or more crossover holes. Embodiments of the present disclosure provide a separator rib having crossover apertures that allow for control over how resupply air is introduced into the trailing edge cavity. Further, such crossover apertures in the separator rib allow for the air to be introduced over a larger area rather than at a single source as with a traditional resupply hole (e.g., resupply hole 628).

Figure 7:
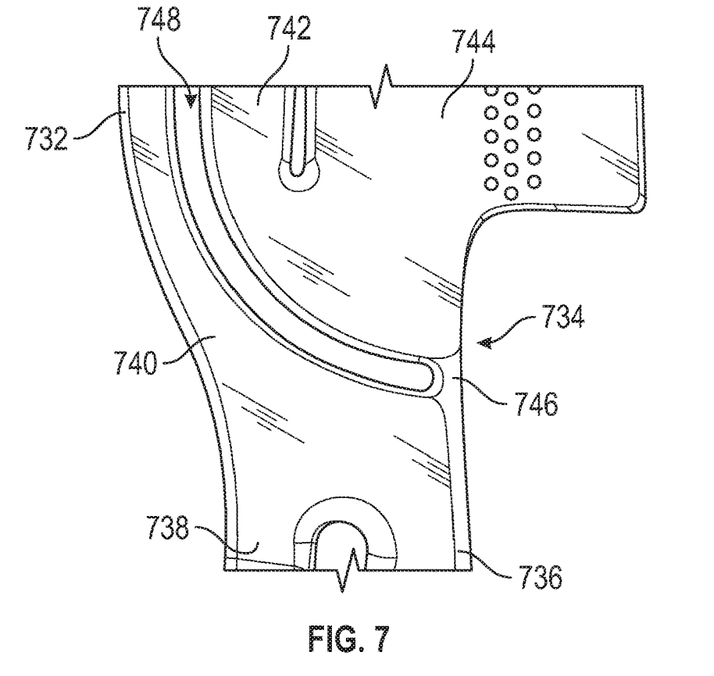
FIG. 7 is a schematic illustration of a portion of a core for manufacturing an airfoil.

Turning now to FIG. 7, a schematic illustration of a portion of a core 732 used to form an airfoil having a separator rib and resupply bypass hole is shown. FIG. 7 is an illustrative side view of a core junction 734 where a resupply cavity core 736 and a serpentine inlet cavity core 738 meet to form a portion of the junction of the airfoil as shown and described above. As shown, the core 732 includes a first serpentine cavity core 740, a second serpentine cavity core 742, and a third serpentine cavity core 744. A bypass core 746 is shown joining the third serpentine cavity core 744 and the resupply cavity core 736. A separator rib void 748 is present between the various cores, as shown in FIG. 7, and is provided to form a separator rib in a manufactured airfoil that is formed from the core 732 (e.g., as shown in FIG. 6).

Figure 8:
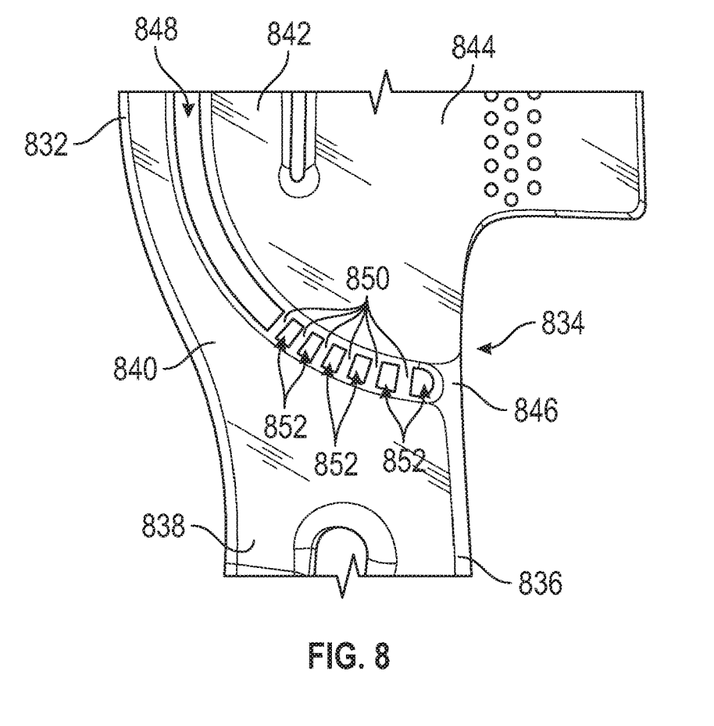
FIG. 8 is a schematic illustration of a portion of a core for manufacturing an airfoil, in accordance with an embodiment of present disclosure.

Turning now to FIG. 8, a schematic illustration of a portion of a core 832 used to form an airfoil having a separator rib, resupply bypass hole, and crossover apertures is shown. FIG. 8 is an illustrative side view of a core junction 834 where a resupply cavity core 836 and a serpentine inlet cavity core 838 meet to form a portion of the junction of the airfoil as shown and described above. As shown, the core 832 includes a first serpentine cavity core 840, a second serpentine cavity core 842, and a third serpentine cavity core 844. A bypass core 846 is shown joining the third serpentine cavity core 844 and the resupply cavity core 836. A separator rib void 848 is present between the various cores, as shown in FIG. 8, and is provided to form a separator rib in a manufactured airfoil that is formed from the core 832.

As shown in FIG. 8, in addition to the bypass core 846 formed at the end of the separator rib void 848 and connecting the resupply cavity core 836 and the third serpentine cavity core 844, one or more crossover cores 850 are provided to form crossover apertures in an airfoil and fluidly connect one or both of the supply cavities with the trailing end of the serpentine cavity flow path. Crossover voids 852 are formed between the various crossover cores 850 and will be filled with material during a manufacturing process and thus form crossover ribs within a manufactured airfoil.

Figure 9:
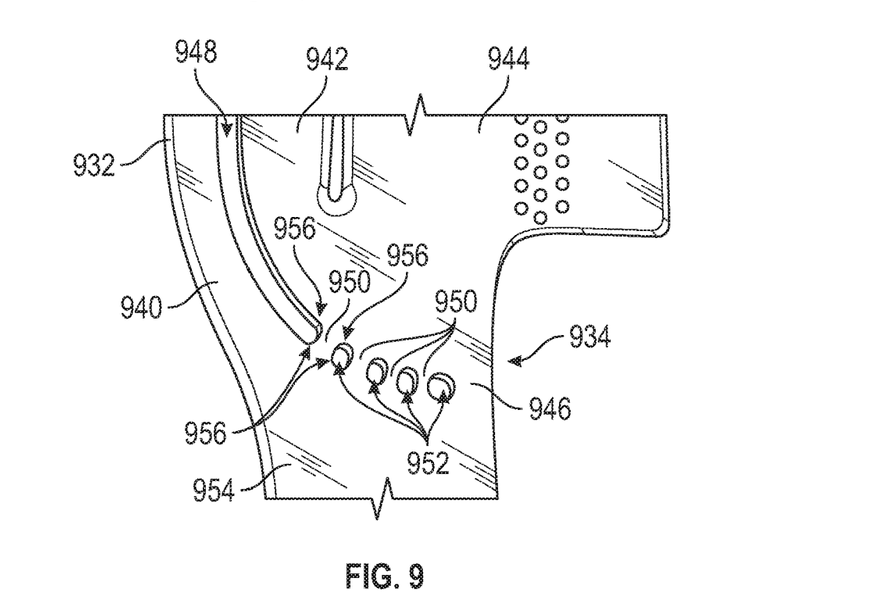
FIG. 9 is a schematic illustration of a portion of a core for manufacturing an airfoil, in accordance with another embodiment of present disclosure.

Turning now to FIG. 9, a schematic illustration of a portion of a another core 932 used to form an airfoil having a separator rib, resupply bypass hole, and crossover apertures is shown. FIG. 9 is an illustrative side view of a core junction 934 where a cooling supply core 954 forms a portion of the core junction 934 below a plurality of separator voids, and serpentine cores 942, 944 are formed above the plurality of separator voids. The cooling supply core 954 is used herein to refer to one or more supply cores that form cavities in an airfoil for supplying cooling air into one or more internal cavities of the airfoil (including but not limited to a serpentine flow path and/or a trailing edge cavity).

As shown, the core 932 includes a first serpentine cavity core 940, a second serpentine cavity core 942, and a third serpentine cavity core 944. A bypass core 946 is shown joining the third serpentine cavity core 944 and the cooling supply core 954. A separator rib void 948 is present between the various cores, as shown in FIG. 9, and is provided to form a separator rib in a manufactured airfoil that is formed from the core 932. Further, similar to the embodiment of FIG. 8, one or more crossover cores 950 are provided to form crossover apertures in an airfoil and fluidly connect a supply cavity (e.g., one or both of the supply cavities described above) with the trailing end of the serpentine cavity flow path. Crossover voids 952 are formed between the various crossover cores 950 and are filled with material during a manufacturing process and thus form crossover ribs within a manufactured airfoil.

In the embodiment shown in FIG. 9, the crossover cores 950 are formed with fillets 956 that reduce local stresses on the faces of the crossover cores 950 (e.g., extending into the page as shown) and/or the formed hole separators formed in a manufactured airfoil. Although shown with a specific geometry, those of skill in the art will appreciate that the crossover cores 950 can be customized to any shape and/or size to fit the needs of the airfoil. For example, in the present illustration, the crossover cores 950 are substantially cylindrical in shape. However, in some embodiments, one or more sides of the crossover cores 950 can be flat and/or squared, depending on, for example, desired flow control and/or manufacturing limitations. Further, in some embodiments a shape, width, size, geometry, etc. of the crossover cores 950 may be substantially the same as the bypass core 946 or may be different therefrom. Further, in some embodiments, each crossover core 950 may be substantially similar as all other crossover cores and in other embodiments, one or more crossover cores may be different than other of the crossover cores. Such arrangements and configurations may be based on desired airflow controls, manufacturing limitations, etc. as will be appreciated by those of skill in the art.

Figure 10A:
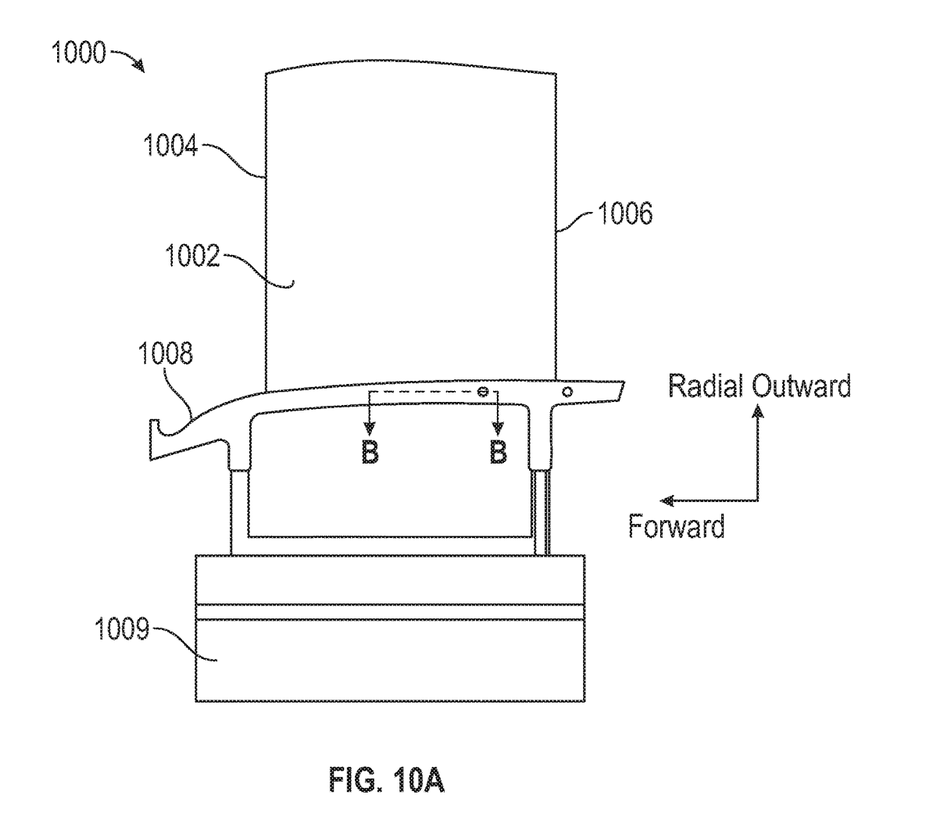
FIG. 10A is a schematic illustration of an airfoil in accordance with an embodiment of the present disclosure.
Figure 10B:
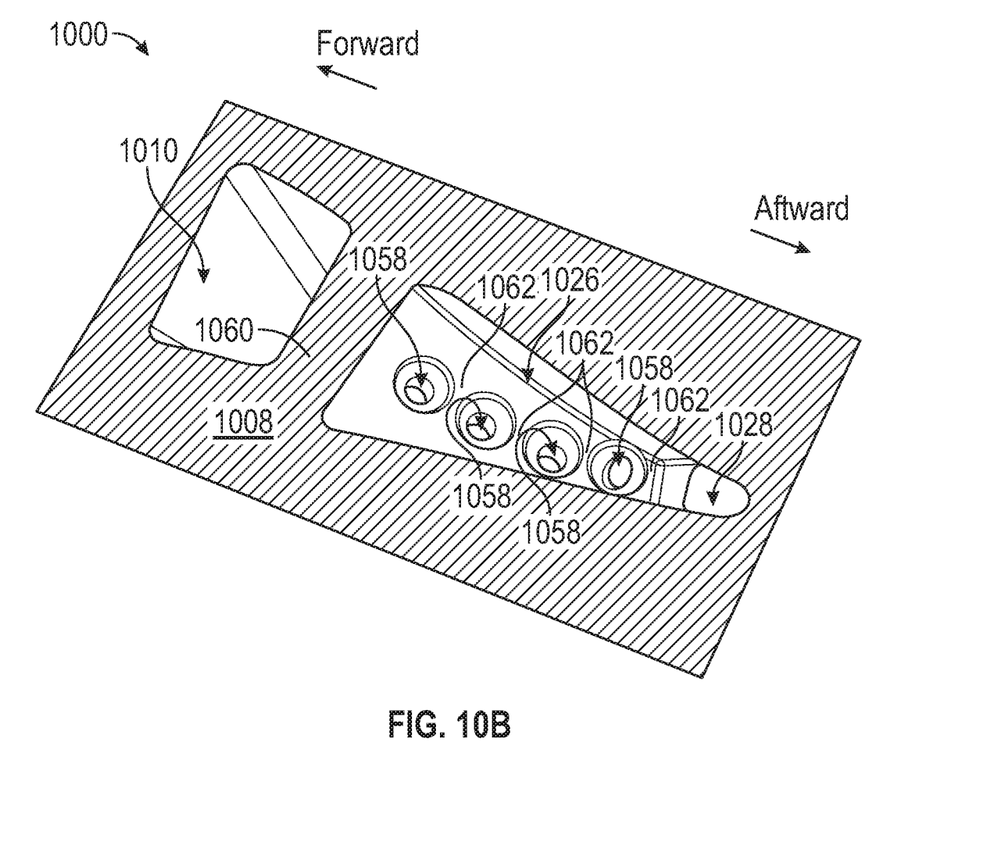
FIG. 10B is a cross-sectional illustration of the airfoil of FIG. 10A as viewed along the line B-B shown in FIG. 10A.

Turning now to FIGS. 10A-10B, schematic illustrations of an airfoil 1000 in accordance with an embodiment of the present disclosure are shown. FIG. 10A is a side elevation view of the 1000 and FIG. 10B is a cross-sectional illustration of the airfoil 1000 as viewed along the line B-B shown in FIG. 10A. The airfoil 1000 has an airfoil body 1002 with a leading edge 1004 and a trailing edge 1006, similar to that shown and described above. In the present illustrative example, the airfoil 1000 is shown as a blade with the airfoil body 1002 extending from a platform 1008. The platform 1008 is arranged to connect to or otherwise attach to a rotor disc for operation within a gas turbine engine by means of attachment 1009 (which may be integral or separate from the airfoil body 1002 or platform 1008).

The airfoil body 1002 and the platform 1008 include internal cooling passages and cavities that are arranged to enable cooling air to flow through the internal portions of the airfoil 1000 to provide cooling during operation. For example, as shown in FIG. 10B, a first serpentine cavity 1010 forms an up-pass flow path of a serpentine flow path within the airfoil 1000. Fluidly connected to the first serpentine cavity 1010 is a second serpentine cavity and a third serpentine cavity, as shown and describe above. In the illustration of FIG. 10B, a junction 1026 is shown which represents the radially inward or lower portions of the second and third serpentine cavities (located at and in the platform 1008 and a lower portion of the airfoil body 1002). Serpentine cooling air flows upward (e.g., radially outward when installed within a gas turbine engine) through the first serpentine cavity 1010 and into the junction 1026. Also located at the junction 1026 is a resupply bypass hole 1028 (aftward of the first serpentine cavity 1010).

As shown in FIG. 10B, the junction 1026 includes a number of crossover apertures 1058 formed in a separator rib 1060 and a plurality of crossover ribs 1062. The separator rib 1060 may fluidly separate portions of the first serpentine cavity 1010 and the second serpentine cavity (e.g., as shown and described above). The airfoil 1000 can be manufactured with cores as shown and described above. The shape, size, and location/position, etc. of the crossover apertures 1058 can be arranged to achieve various desired results including, but not limited to, reducing local stress in the junction 1026, achieve desired flow control, structure and/or manufacturing requirements, etc. Similarly, the separator rib 1060 and/or the crossover ribs 1062 can be arranged, sized, angled, positioned, etc. to achieve desired results and/or based various restrictions in a given configuration. In accordance with some embodiments of the present disclosure, the geometry of the crossover apertures 1058 can be circular, elliptical, or "racetrack" shaped with a minimum diameter (e.g., narrowest portion). The crossover apertures 1058 can be formed either by casting techniques, refractory metal core techniques, or combination of methods. In some embodiments, the crossover apertures 1058 can be formed using quartz rods or in other embodiments may be formed by integral parts of a core.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body having a leading edge and a trailing edge;
    a first serpentine cavity formed within the airfoil body and defining a portion of a serpentine cooling flow path and enabling a cooling flow in a first direction within the airfoil body;
    a second serpentine cavity fluidly connected to the first serpentine cavity and defining another portion of the serpentine cooling flow path and enabling a cooling flow in a second direction; and
    a third serpentine cavity fluidly connected to the second serpentine cavity and defining another portion of the serpentine cooling flow path and enabling a cooling flow in at least one of the first direction or a third direction, wherein a serpentine cooling air flows through the serpentine cooling flow path;
    a resupply cavity fluidly connected to the third serpentine cavity and arranged to supply a resupply air to the third serpentine cavity through a resupply bypass hole;
    a junction defined where both the second serpentine cavity and the resupply cavity fluidly connect to the third serpentine cavity; and
    a separator rib within the airfoil body and fluidly separating part of the first serpentine cavity from the second serpentine cavity,
    wherein the separator rib includes at least one crossover rib located between the resupply bypass hole and
    at least one crossover aperture that is formed in the separator rib to fluidly connect the resupply cavity to at least one of the second serpentine cavity and the third serpentine cavity.

2. The airfoil of claim 1, comprising a plurality of crossover ribs located between the resupply bypass hole and the separator rib and a plurality of crossover apertures defined in part by the crossover ribs.

3. The airfoil of claim 1, wherein the at least one crossover aperture includes a fillet.

4. The airfoil of claim 1, further comprising a platform wherein the airfoil body extends from the platform, wherein the junction is located where the platform and airfoil body join.

5. The airfoil of claim 4, further comprising an attachment, the attachment extending from the platform from a side of the platform opposite from the airfoil body.

6. The airfoil of claim 1, further comprising a serpentine inlet arranged to supply serpentine cooling air into the one of the at least two serpentine flow cavities.

7. The airfoil of claim 6, wherein a portion of the resupply air is fed into the serpentine cooling air at a location upstream from the resupply bypass hole.

8. The airfoil of claim 1, wherein at least one crossover aperture is circular, elliptical, or "racetrack" shaped.

9. A core for manufacturing an airfoil of a gas turbine engine, the core comprising:
    a first serpentine cavity core arranged to define a first serpentine cavity with a cooling flow in a first direction within a formed airfoil body;
    a second serpentine cavity core connected to the first serpentine cavity core and arranged to define a second serpentine cavity with a cooling flow in a second direction within the formed airfoil body; and
    a third serpentine cavity core connected to the second serpentine cavity core and arranged to define a third serpentine cavity with a cooling flow in at least one of the first direction or a third direction within the formed airfoil body;
    a resupply cavity core connected to one of the serpentine cavity cores by a bypass core and arranged to form a resupply cavity in the formed airfoil body and a resupply bypass hole defined by the bypass core, wherein a core junction is defined and located at a location of the resupply cavity core, the bypass core, the second serpentine cavity core, and the third serpentine cavity core are connected; and
    at least one crossover core located in the core junction to define a respective crossover aperture, with a separator rib void located between a portion of the first serpentine cavity core and the second serpentine cavity core and ending at the at least one crossover core to define a separator rib in the formed airfoil and at least one crossover void located between the at least one crossover core and the bypass core, the at least one crossover void forming a crossover rib within the formed airfoil body as part of the formed separator rib.

10. The core of claim 9, further comprising a plurality of crossover cores, and a plurality of crossover voids located between the plurality of crossover cores, the separator rib void, and the bypass core.

11. The core of claim 9, wherein the at least one crossover core includes a fillet.

12. The core of claim 9, wherein at least one crossover core is circular, elliptical, or "racetrack" shaped.

* * * * *